United States Patent [19]

Krapcho et al.

[11] 3,923,816
[45] Dec. 2, 1975

[54] 2H-PYRAZOLO[4,3-C]PYRIDINES

[75] Inventors: John Krapcho, Somerset; Chester Frank Turk, Kendall Park, both of N.J.

[73] Assignee: E. R. Squibb & Sons, Inc., Princeton, N.J.

[22] Filed: July 22, 1974

[21] Appl. No.: 490,176

[52] U.S. Cl. ........ 260/293.55; 260/293.52; 424/267
[51] Int. Cl.² .................................... C07D 401/02
[58] Field of Search .................. 260/293.52, 293.55

[56] References Cited
OTHER PUBLICATIONS

Morrison et al., "Organic Chemistry," 2nd Ed., Allyn and Bacon, Boston (1966), pp. 180–183.
Shirley, "Organic Chemistry," Holt, Rinehart & Winston, New York (1964), pp. 76–77.
Horlein, Chem. Ber. 87, 463–472 (1954).
Hegningen, J. Am. Chem. Soc. 80, 156–158 (1958).

*Primary Examiner*—G. Thomas Todd
*Attorney, Agent, or Firm*—Lawrence S. Levinson; Merle J. Smith, Burton Rodney

[57] ABSTRACT

Compounds of the formula

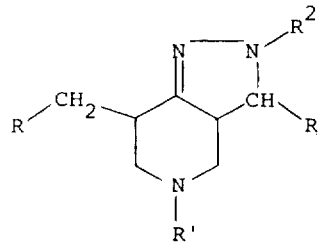

have been found to possess antiinflammatory activity.

7 Claims, No Drawings

2H-PYRAZOLO[4,3-C]PYRIDINES

OBJECTS OF THE INVENTION

It is an object of the present invention to provide compounds which possess antiinflammatory activity. Another object is to provide compositions for the utilization of these compounds. A further object is to provide a method for the preparation of the compounds of the present invention. These and other objects of the present invention will become apparent from the following description.

SUMMARY OF THE INVENTION

It has now been found that a compound of the formula

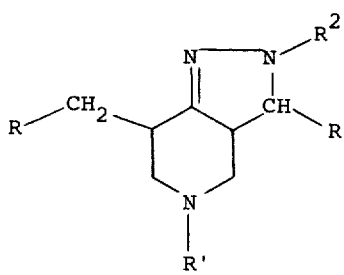

and the N-oxide and the pharmaceutically acceptable acid-addition salts thereof possesses antiinflammatory activity when administered systemically to mammalian species.

DETAILED DESCRIPTION

The compounds of the present invention have the generic formula

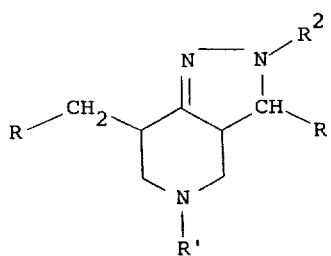

I wherein R is

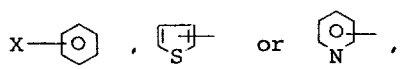

wherein X is hydrogen, chloro, fluoro, alkyl of from 1 to 4 carbon atoms, alkoxy of from 1 to 4 carbon atoms or trifluoromethyl, wherein each R group may be the same or different, $R^1$ and $R^2$ are hydrogen, alkyl of from 1 to 4 carbon atoms, hydroxy lower alkyl wherein the alkyl group has from 1 to 4 carbon atoms, alkanoyl of from 1 to 4 carbon atoms, or X-substituted phenyl alkyl wherein X has the same meaning as above and the alkyl group has from 1 to 4 carbon atoms.

The compounds of the present invention are prepared by reacting a 4-piperidone of formula II (wherein R' has the same meaning as above) with an aldehyde of the formula RCHO wherein R is an previously defined, utilizing the procedure described in the Journal of the American Chemical Society, 70, 1824 (1948), which is incorporated by reference, to yield compounds of formula III.

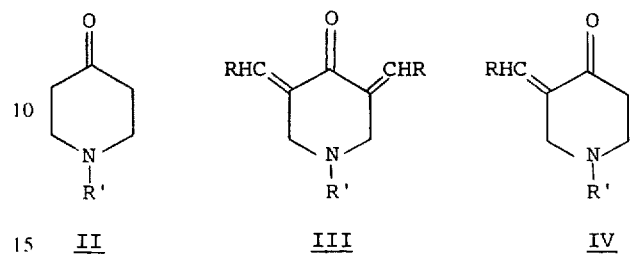

By adjusting the ratio of reactants so as to have an excess of the compound of formula II present, a compound of formula IV is obtained. A compound of formula III wherein each benzylidene substituent is different is prepared by reacting a compound of formula IV with an aldehyde different from that used to form the compound of formula III.

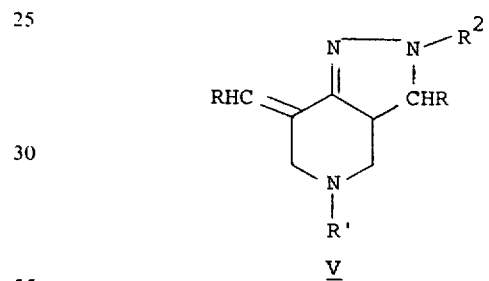

The compounds of formula III are generally isolated in the form of their acid addition salts.

A compound of formula III, preferably an acid-addition salt such as the hydrochloride salt, and so forth, is converted to a compound of formula V by reaction with a hydrazine of the formula $H_2NNHR^2$, wherein $R^2$ is as previously defined. This reaction takes place in a polar organic solvent, preferably a water miscible alcohol at a temperature of from about 40°C to about 120°C, preferably at about the reflux temperature of the solvent for from about ½ hour to about 12 hours, preferably from about 2 to about 6 hours. The resulting compounds of formula V are generally purified in the form of a mono- or di- acid addition salt. A compound of formula V wherein $R^1$ is alkanoyl of from 1 to 4 carbon atoms is prepared by acylating a compound of formula I wherein $R^1$ is hydrogen employing conventional acylating agents under known conditions, for example an acylating agent such as acetic anhydride or propionyl chloride and the like in an inert solvent, such as benzene, toluene, ether or tetrahydrofuran and so forth.

A compound of formula V is converted to a compound of fomula I by catalytic hydrogenation, e.g., palladium on carbon, platinum oxide, or rhodium, under conventional conditions. When R' in the compound of formula I is H, preferably the starting piperidone is the N-acyl derivative, e.g., the N-acetyl or N-benzoyl derivative. In the resulting compound of formula III, R' is H.

The hydrazines of formula $H_2NNHR$ are commercially available or are prepared according to known techniques, for examples, by reacting chloramine, NH$_2$Cl, with an amine of the formula RNH$_2$.

A compound of formula I may be converted to its N-oxide by reaction with an oxidizing agent such as hydrogen peroxide, peracetic acid and so forth.

The compounds of the present invention, their N-oxides, and their non-toxic pharmaceutically acceptable mono- or di- acid addition salts are useful as anti-inflammatory agents in mammalian species, e.g., rats and mice, when administered systemically in amounts ranging from about 0.5 mg/kg to about 10.0 mg/kg of body weight per day. A preferred dosage regimen for optimum results is from about 1 mg to about 5 mg per kg of body weight per day, and such dosage units are employed that a total of about 35 mg to about 7 g of active ingredient are administered in a 24-hour period for a subject of about 70 kg body weight.

The compounds of the present invention in the described dosages may be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of the invention may be incorporated with excipients and used in the form of tablets, troches, capsules, elixirs, suspensions, syrups, wafers, chewing gum, and the like. The amount of active compound in such theapeutically useful compositions therapeutically preparations is such that a suitable dosage will be obtained.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup of elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

As to the pharmaceutically acceptable salts, those coming within the purview of this invention include the pharmaceutically acceptable acid-addition salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, or methanesulfonic.

The following examples illustrate the present invention, without, however, limiting the same thereto. All temperatures are expressed in degrees Centigrade.

EXAMPLE 1

3,3a,4,5,6,7-Hexahydro-2-methyl-3-phenyl-7-(phenylmethyl)-2H-pyrazolo[4,3-c]pyridine hydrochloride A. 3,5-dibenzylidine-4-piperidone, hydrochloride 14 g. (0.1 mole) of N-acetyl-4-piperidone and 32 g (0.3 mole) of benzaldehyde in 150 ml of ethanol is cooled to 15° and treated dropwise with 33ml of concentrated HCl, refluxed for 6 hours, and stored overnight at room temperature. The light yellow solid is filtered, washed with ethanol, then with ether and air-dried, weight 26 g (83%) mp. 273°–275° (dec.).

B. 7-benzylidine-3,3a,4,5,6,7-hexahydro-2-methyl-3-phenyl-2H-pyrazolo-[4,3-c]pyridine, hydrochloride The product from A (9.5 g. 0.0305 mole) and 1.5 g (0.032 mole) of methylhydrazine in 200 ml of methanol is heated and the resulting solution refluxed for 4 hours. The solvent is removed on a rotary evaporator to yield a solid residue which on trituration with ether and cooling gives 9.5 g. (92%) of the title compound, mp 210°–212°. Following crystallization from 250 ml of ethanol, the light yellow material melts at 218°–220°.

C. 3,3a,4,5,6,7-Hexahydro-2-methyl-3-phenyl-7-(phenylmethyl)-2H-pyrazolo [4,3-pyridine, hydrochloride A mixture of 7.0 g. (0.021 mole) of the product from B, 200 ml of ethanol, and 1 g of 5% Pd-C catalyst is shaken on the Parr hydrogenator for 5 hours. The catalyst is filtered off, washed with ethanol, and the combined filtrates evaporated to give a tacky residue which is triturated with 100 ml of boiling acetonitrile. The insoluble solid is filtered, washed with cold acetonitrile and dried, weight 0.7 g; mp 222°–224°.

The acetonitrile filtrate is stored in the cold room for 3 days during which time additional solid separates. This solid is filtered, washed with cold acetonitrile and with ether, and dried in vacuo, weight 4.8 g (60%); mp 192°–194°. Following recrystallization from 100 ml of acetonitrile, the colorless solid weighs 3.8 g (54%), mp 194°–196°.

EXAMPLE 2

7-Benzyl-3,3a,4,5,6,7-hexahydro-2,5-dimethyl-3-phenyl-2H-pyrazolo[4,3-C]pyridine, fumarate salt A. 3,5-Dibenzylidene-1-methyl-4-piperidone, hydrochloride A solution of 57.0 g (0.5 mole) of 1-methyl-4-piperidone and 106.0 g (1.0 mole) of benzaldehyde in 400 ml of ethanol is cooled in an ice bath and treated with HCl gas until 250 g is absorbed. The red-colored solution is allowed to stand at room temperature overnight. The resulting deep red-brown solution is seeded, allowed to stand overnight at room temperature, and the crystalline solid is filtered on a sintered-glass funnel and washed with cold ethanol, followed by ether. After drying in a disiccator, the solid (146g) is digested in 400 ml of hot ethanol (75°), cooled and filtered to give 120 g (74%) of pale yellow product, m.p. 242°–244° (dec).

Recrystallization of 11 g of this material from 35 ml of dimethylformamide (DMF) gives 9.2 g of product, m.p. 242°–244° (dec).

B. 7-Benzylidene-3,3a,4,5,6,7-hexahydro-2,5-dimethyl-3-phenyl-2H-pyrazolo-[4,3-c]pyridine, hydrochloride A suspension of 10.0 g (0.0306 mole) of the product from part A in 100 ml of methanol is treated with 1.5 g (0.0306 mole) of methylhydrazine, heated and the resulting solution is refluxed for 4 hours. The solvent is removed on a rotary evaporator and the crystalline yellow solid (12.6 g, mp 102°–105°) is dissolved in 100 ml of acetonitrile and treated with 4.6 ml of 6.7 N alcoholic HCl. The crystalline dihydrochloride salt separates after several minutes. The mixture is allowed to stand at room temperature for 3 hours, filtered, washed with cold acetonitrile and ether and dried in a desiccator to give 11.3 g of yellow product, mp 154°–156 (dec). This material is suspended in 100 ml of methanol, warmed slightly to obtain a solution and the latter diluted to 400 ml with ether. The product separates as large clusters of plate-like crystals at room temperature. After cooling overnight, the pale yellow product is filtered and dried in a desiccator; weight, 10.0 g (80%), mp 157°–159° (dec.).

C. 7-Benzyl-3,3a,4,5,6,7-hexahydro-2,5-dimethyl-3-phenyl-2H-pyrazole[4,3-c]pyridine, fumarate salt A mixture of 10 g (0.024 mole) of the product from part B, 1 g of 5% Pd-C catalyst, and 200 ml of ethanol is shaken on the Parr hydrogenator for 3 hours at a starting pressure of 50 lbs. The theoretical quantity of $H_2$ is absorbed in approximately 2hours. The catalyst is filtered, washed with ethanol, and the combined filtrates are evaporated to give a syrupy residue which becomes granular when rubbed under ether and cooled overnight. The nearly colorless, hygroscopic, material weighs 9.2 g.

The above HCl salt is dissolved in 100 ml of $H_2O$, cooled, layered over with 100 ml of ether, basified with 7 g of $K_2CO_3$, and shaken. The layers are separated, the aqueous phase extracted with ether (3 × 100 ml), the combined extracts dried ($MgSO_4$), and the solvent evaporated to give 6.7 g of oily base.

The above base (6.5g) and 1.8 g of oxalic acid are dissolved in 40 ml of warm acetonitrile. After a few seconds, the crystalline oxalate begins to separate. The material is allowed to crystallize overnight. The yield of colorless material is 5.9 g; mp 198°–200° (dec.). Crystallization from 150 ml of MeOH gives 3.4 g of colorless solid; mp 210–212° (dec.).

The oxalate salt is converted to the free base in the manner described above for the HCl salt.

This base (2.9 g) and 1.06 g of fumaric acid are dissolved in 25 ml of boiling acetonitrile. Since no crystallization occurs on cooling, the solvent is evaporated and the solid residue is triturated with ether, filtered, and dried in vacuo. The yield of nearly colorless material is 3.4 g (31%); mp 120°–122° (s. 75%. The product does not crystallize from any of the common solvents.

EXAMPLES 3–13

Following the procedure of example 1 but substituting for benzaldehyde in part A, the compound indicated in column I, there is obtained the corresponding compound of formula I wherein each X, and its position, is as indicated in column II:

| Example | I | II |
|---|---|---|
| 3. | o-chlorobenzaldehyde | 2-chloro |
| 4. | p-chlorobenzaldehyde | 4-chloro |
| 5. | p-fluorobenzaldehyde | 4-fluoro |
| 6. | 2-methylbenzaldehyde | 2-methyl |
| 7. | 3-methylbenzaldehyde | 3-methyl |
| 8. | 4-methylbenzaldehyde | 4-methyl |
| 9. | 2-methoxybenzaldehyde | 2-methoxy |
| 10. | 3-methoxybenzaldehyde | 3-methoxy |
| 11. | 4-methoxybenzaldehyde | 4-methoxy |
| 12. | 4-butoxybenzaldehyde | 4-butoxy |
| 13. | 3-trifluoromethylbenzaldehyde | 3-trifluoromethyl |

EXAMPLES 14–31

Following the procedure of example 2 but substituting for methylhydrazine in part B, the compound indicated in column I, there is obtained the corresponding compound of formula I wherein $R^2$ is the group indicated in column II:

| Example | I | II |
|---|---|---|
| 14. | ethylhydrazine | ethyl |
| 15. | propylhydrazine | propyl |
| 16. | isopropylhydrazine | isopropyl |
| 17. | isobutylhydrazine | isobutyl |
| 18. | butylhydrazine | butyl |
| 19. | (2-hydroxyethyl)hydrazine | 2-hydroxyethyl |
| 20. | 1,2-dihydroxy-3-hydrazinopropane | 1,2-dihydroxypropyl |
| 21. | benzylhydrazine | benzyl |
| 22. | phenethylhydrazine | phenethyl |
| 23. | o-fluorobenzylhydrazine | o-fluorobenzyl |
| 24. | m-chlorophenylethylhydrazine | m-chlorophenylethyl |
| 25. | p-trifluoromethylbenzylhydrazine | p-trifluoromethylbenzyl |
| 26. | m-methylbenzylhydrazine | m-methylbenzyl |
| 27. | o-ethylphenethylhydrazine | o-ethylphenethyl |
| 28. | m-methoxybenzylhydrazine | m-methoxybenzyl |
| 29. | p-ethoxyphenylethylhydrazine | p-ethoxyphenethyl |
| 30. | 3-(phenyl)propylhydrazine | 3-(phenyl)propyl |
| 31. | hydrazine | hydrogen |

EXAMPLES 32–36

7-Heterocyclo-3,3a,4,5,6,7-hexahydro-2,5-dimethyl-3-heterocyclo-2H-pyrazole[4,3-c]pyridine, hydrochlorides According to the procedure of example 2, upon substituting in place of benzaldehyde, one of the following compounds:

thiophene-2-carboxaldehyde
pyridine-4-carboxaldehyde
pyridine-2-carboxaldehyde
thiophene-3-carboxaldehyde
pyridine-3-carboxaldehyde there is obtained, respectively, the compound of formula I wherein $R^1$ and $R^2$ are methyl and R is the group indicated below 32. 2-thienyl
33. 4-pyridyl
34. 2-pyridyl
35. 3-thienyl
36. 3-pyridyl

EXAMPLES 37–41

Following the procedure of example 2 but substituting for N-methylpiperidone in part A the compounds listed in column I, there is obtained the corresponding compound of formula I wherein R' is the group listed in column II.

| Example | I | II |
|---|---|---|
| 37. | N-ethyl-4-piperidone | ethyl |
| 38. | N-benzyl-4-piperidone | benzyl |
| 39. | N-phenethyl-4-piperidone | phenethyl |
| 40. | N-p-chlorophenethyl-4-piperidone | p-chlorophenethyl |
| 41. | N-2-hydroxyethyl-4-piperidone | 2-hydroxyethyl |

EXAMPLES 42–43

Refluxing the final products of examples 1 and 31 with an equivalent quantity of propionyl chloride in chloroform for 1hour, yields, respectively, 3,3a,4,5,6,7-hexahydro-2-methyl-3-phenyl-7-(phenyl-methyl)-5-propionyl-2H-pyrazolo[4,3c]-pyridine, hydrochloride, and 3,3a,4,5,6,7-hexahydro-5-methyl-3-phenyl-7-(phenylmethyl)-2-propionyl-2H-pyrazolo[4,3-c]-pyridine, hydrochloride.

EXAMPLE 44

3,3a,4,5,6,7-Hexahydro-2-methyl-3-phenyl-7-(phenylmethyl)-2H-pyrazolo[4,3-c]pyridine N-oxide A solution of the free base of the product of example 1 in acetic acid is treated with an equivalent quantity of 30% hydrogen peroxide and the solution then heated at 80°–90° for 1 hour and cooled. The solvent is then removed on a rotary evaporator at reduced pressure to yield the title compound.

EXAMPLE 45

Preparation of capsule formulation

| Ingredient | Milligrams per Capsule |
|---|---|
| 3,3a,4,5,6,7-hexahydro-2-methyl-3-phenyl-7-(phenylmethyl)-2H-pyrazolo[4,3-c]pyridine hydrochloride | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 46

Preparation of tablet formulation

| Ingredient | Milligrams per Tablet |
|---|---|
| 7-benzyl-3,3a,4,5,6,7-hexahydro-2,5-dimethyl-3-phenyl-2H-pyrazolo-[4,3-c]pyridine, fumarate salt | 350 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 milligrams of active ingredient.

EXAMPLE 47

Preparation of oral syrup formulation

| Ingredient | Amount |
|---|---|
| 2,3,4a,4,6,7-hexahydro-2-methyl-3-phenyl-7-(phenylmethylene)-5H-pyrazolo[4,3-c]pyridine-N-oxide | 500 mg. |
| Sorbitol solution (70% N.F.) | 40 ml. |
| Sodium benzoate | 150 mg. |
| Sucaryl | 90 mg. |
| Saccharin | 10 mg. |
| Red Dye (F.D. & Co. No. 2) | 10 mg. |
| Cherry flavor | 50 mg. |
| Distilled water qs to | 100 ml. |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphate, citrates or tartrates may be added as buffers. Preservatives may include the parabens, sorbic acid and the like and other flavors and dyes may be used in place of those listed above.

What is claimed is:

1. A compound of the formula

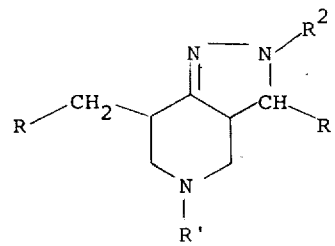

wherein R is

wherein X is H, Cl, F, $CF_3$, alkyl of from 1 to 4 carbon atoms, or alkoxy of from 1 to 4 carbon atoms, provided each R may be the same or different;

$R^1$ and $R^2$ are H, alkyl of from 1 to 4 carbon atoms, hydroxy lower alkyl wherein the alkyl group has from 1 to 4 carbon atoms, alkanoyl of from 1 to 4 carbon atoms or X-substituted phenyl alkyl wherein X and alkyl have the same meaning as above, and the N-oxides and pharmaceutically acceptable acid addition salts thereof.

2. A compound of claim 1 wherein R is

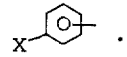

3. A compound of claim 1 wherein $R^1$ is alkyl of from 1 to 4 carbon atoms.

4. A compound of claim 1 wherein $R^2$ is alkyl of from 1 to 4 carbon atoms.

5. A compound of claim 2 wherein $R^1$ and $R^2$ are alkyl of from 1 to 4 carbon atoms.

6. A compound of claim 1 having the name 3,3a,4,5,6,7-hexahydro-2-methyl-3-phenyl-7-(phenylmethyl)-2H-pyrazolo-[4,3-c]pyridine hydrochloride.

7. A compound of claim 1 having the name 7-benzyl-3,3a,4,5,6,7-hexahydro2,5-dimethyl-3-phenyl-2H-pyrazolo-[4,3-c]pyridine, fumarate salt.

* * * * *

UNITED STATES PATENT AND TRADEMARK OFFICE
CERTIFICATE OF CORRECTION

PATENT NO. : 3,923,816
DATED : December 2, 1975
INVENTOR(S) : John Krapcho et al.

It is certified that error appears in the above-identified patent and that said Letters Patent are hereby corrected as shown below:

Column 2, line 1, "an" should read --as--.
Column 2, line 46, "120°C." should read --120°C,--.
Column 3, line 27, "the", second occurrence, insert -- this --.
Column 3, line 32, "therapeutically" should read --or--.
Column 4, line 25, "[4,3-" should read --[4,3-c]--.
Column 4, line 45, "[4,3-C]" should read --[4,3-c]--.
Column 4, line 57, "disiccator" should read --desiccator--.
Column 5, line 9, "154°-156" should read --154-156°--.
Column 5, line 13, "pyrazole" should read --pyrazolo--.
Column 5, line 49, "75°%" should read --75°)--.
Column 6, line 31, "pyrazole" should read --pyrazolo--.
Column 8, line 69, "clain" should read --claim--,
Column 8, line 70, "hexahydro2,5" should read --hexahydro-2,5--.

Signed and Sealed this thirtieth Day of March 1976

[SEAL]

Attest:

RUTH C. MASON
*Attesting Officer*

C. MARSHALL DANN
*Commissioner of Patents and Trademarks*